United States Patent [19]

Enderle

[11] Patent Number: 5,094,070
[45] Date of Patent: Mar. 10, 1992

[54] PROPELLING NOZZLE FOR A HYPERSONIC JET PLANE

[75] Inventor: Heinrich Enderle, Gröbenzell, Fed. Rep. of Germany

[73] Assignee: MTU Motoren- und Turbinen Union Munchin GmbH, Fed. Rep. of Germany

[21] Appl. No.: 505,044

[22] Filed: Apr. 5, 1990

[30] Foreign Application Priority Data

Apr. 14, 1989 [DE] Fed. Rep. of Germany ....... 3912331

[51] Int. Cl.$^5$ ............ F02K 1/12; F02K 1/62; F02K 7/16
[52] U.S. Cl. ...................... 60/224; 60/225; 60/230; 60/270.1
[58] Field of Search ............ 60/224, 225, 270.1, 60/226.2, 230

[56] References Cited

U.S. PATENT DOCUMENTS 4,919,364  4/1990  John et al. .................. 60/225

Primary Examiner—Richard A. Bertsch
Assistant Examiner—Howard R. Richman
Attorney, Agent, or Firm—Evenson, Wands, Edwards, Lenahan & McKeown

[57] ABSTRACT

A propelling nozzle for a hypersonic jet plane having movable upper and lower primary and secondary flaps assigned to the gas turbojet engine as well as to the ramjet engine, both engines being arranged axially above one another, their outlet ducts being separated by means of a partition extending in the downstream direction to the narrowest cross-section of the propelling nozzle. The nozzle flaps can place themselves against the end edge of the partition on both sides in a manner advantageous with respect to the flow in the transition area from the primary flaps to the secondary flaps. As a result, each of the two outlet ducts can advantageously, either alternatively or simultaneously, be closed or opened, while, at the same time, a narrow cross-section and a divergence of the propelling nozzle can be adjusted which are optimal for the respective flying Mach number.

13 Claims, 3 Drawing Sheets

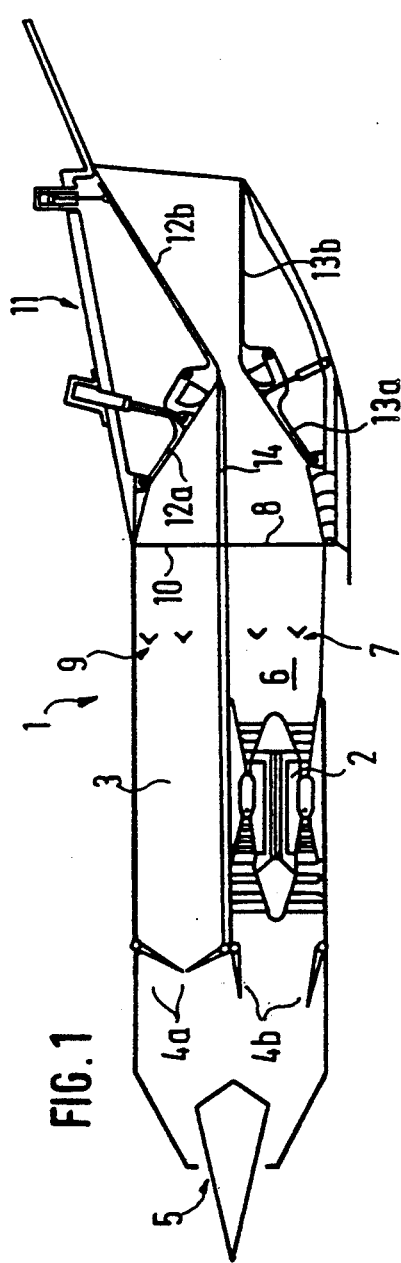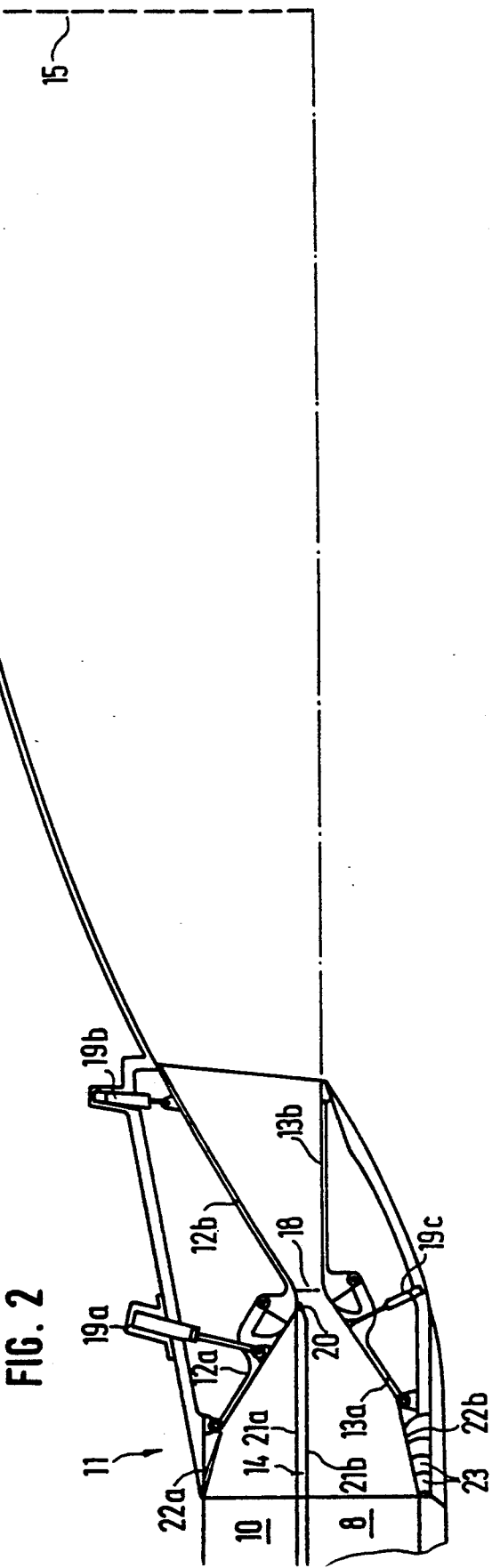

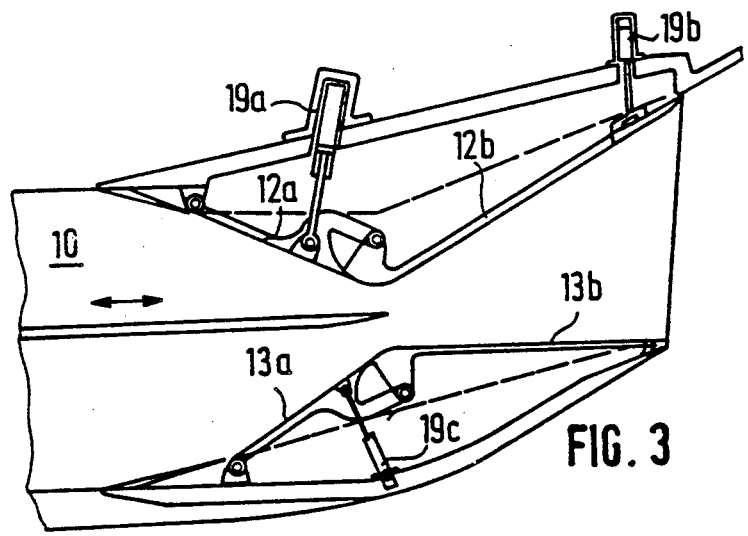
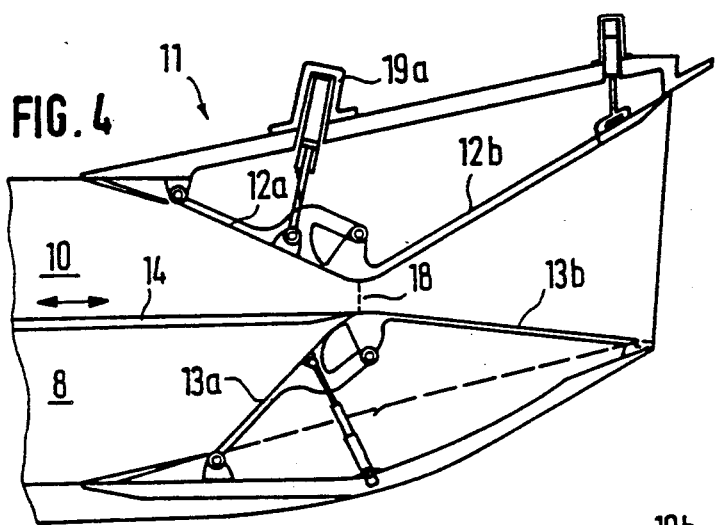
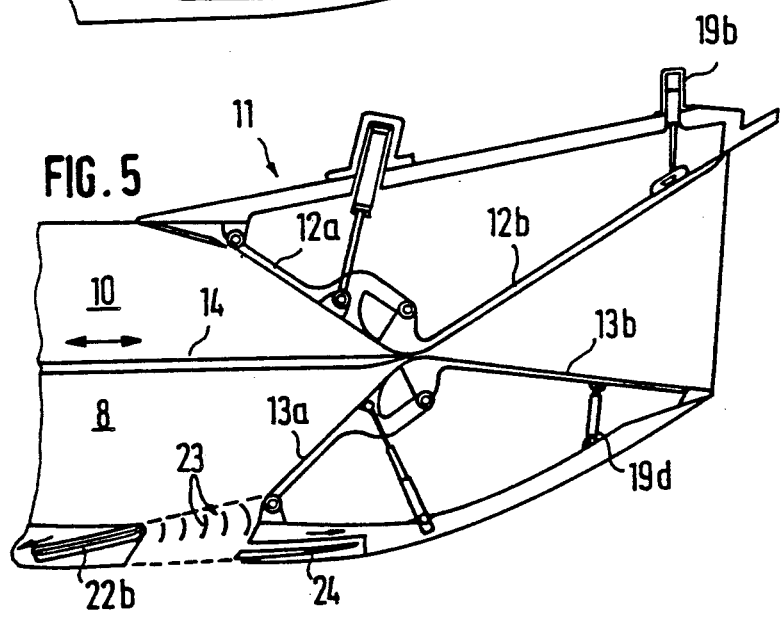

PROPELLING NOZZLE FOR A HYPERSONIC JET PLANE

BACKGROUND AND SUMMARY OF THE INVENTION

The invention relates to a propelling nozzle for a flying aggregate equipped with combined turboramjet engines, in which a variable course of the contour of the nozzle is in each case developed between upper and lower primary and secondary flaps which are sealingly movably guided at parallel wall surfaces of a square nozzle housing, the primary flaps, in each case, being pivotally connected upstream to the nozzle housing, and the secondary flaps, in each case, being pivotally connected to pivots of the primary flaps situated on the side facing away from the nozzle flow and with sections which are essentially concentric with respect to these pivots, and being selectively movable into and out of the primary flaps in an aerodynamically surface-covering manner. The invention also relates to a process for adjusting this propelling nozzle as a function of different flying speeds and is an improvement to the invention described in commonly assigned German Patent Application P 39 01 487, corresponding U.S. Pat. application Ser. No. PCT/DE90/00020, filed Jan. 16, 1990.

It was an object of this above-noted German application to provide a propelling nozzle which, as a supersonic expansion nozzle, makes it possible to achieve an adjustment of the cross-sectional surface of the nozzle throat which is advantageous over a wide operating range without causing compression shocks. In particular, the nozzle flow was to be adapted to a large environmental pressure range (extremely different flying altitudes) with an optimal thrust.

This object was achieved by the above-noted combination of features.

On this basis, it is an object of the present invention to use such a nozzle for a combined turboramjet engine in which the two engines are constructed separately of one another with separate outlet ducts.

According to the invention, this object is achieved in that the gas turbojet engine and the ramjet engine are arranged axially above one another, and their outlet ducts end with rectangular cross-sections, and a partition is provided between both outlet ducts which extends in the downstream direction to the narrowest cross-section of the propelling nozzle, and the nozzle flaps, in the transition area from the primary flaps to the secondary flaps, on both sides, being placeable against its edge area in an advantageous manner with respect to the flow.

A principal advantage of this arrangement according to the invention is that, in the turbo-operation, in a simultaneous turbo-operation and ramjet operation and in the exclusive ramjet operation, the optimal narrow cross-section of the nozzle as well as the nozzle divergence can easily be adjusted in an optimal and low-loss manner. It is also an important advantage that the same nozzle arrangement may be used for all three operating methods without having to accept compromises with respect to efficiency. Advantageously, the turbojet engine and the ramjet engine may be installed and also operated separately from one another, while nevertheless the same propelling nozzle may be used for both arrangements. Up to now, this had been considered feasibly only for integrated turboramjet engines in which the ramjet combustion chamber is simultaneously the turbo-afterburner chamber; i.e., wherein the gas turbo-engine and the ramjet engine are quasi-concentrically arranged with respect to one another. It is also an advantage of preferred embodiments of the invention that the partition causes a transverse stiffening of the propelling nozzle.

In a further development according to the invention, the end edge of the partition is extended u in the direction of the top side of the partition making it possible to achieve a contour from the bottom side of the partition to the top side of the secondary flap which is advantageous with respect to the flow when the upper pair of nozzle flaps (turbo-operation) rests against it.

An advantageous further development of the invention provides that the partition is movable which, in a preferred embodiment of the invention is achieved by the fact that the partition can be retracted in an axial upstream direction. However, advantageously, the partition can be swivelled around a transverse axis situated in the wall plane, or the partition comprises a first upstream rigid section and a second pivoted partition section connected to it in an advantageous manner with respect to the flow. This arrangement has the advantage that, for the adjustment of the narrow cross-section and the nozzle divergence, the two nozzle flap pairs may have a considerably more restricted adjusting range since part of the kinematic adaptation is taken over by the movable partition and the movable partition section. In comparison to a rigid partition, as a result of the smaller swivel range of the nozzle flap pairs, a transition into its extreme positions can also be achieved that is more advantageous with respect to the flow.

In a preferred further development of the invention, devices for locking the partition in discrete positions ar provided on both sides in the lateral nozzle walls of the rectangular nozzle. These may, for example, be constructed as pins which can be moved out in the area of the end edge and which can be moved into corresponding recesses of the partition. As a result, the very high pressure forces (approximately 40 t) are absorbed and the swivel arrangement is relieved. Preferably, three different discrete positions are provided, specifically a first position with a maximum positive slope for the turbo-operation; a second, approximately horizontal position for a simultaneous turbo-operation and ramjet operation; and a third position with a maximum downward slope for an exclusive ramjet operation. If required, intermediate positions may also be adjustable, or the movable partition section may even be adjustable continuously. It is also possible to provide only two discrete positions between which a changing-over takes place. The change-over from one position to another position preferably takes place during a simultaneous turbo-operation and ramjet operation, in which case an approximately identical pressure is adjusted on both sides of the movable partition section, and the change-over may take place by a swivel arrangement with small dimensions.

A further advantageous development of the invention provides that closable reversed thrust openings are provided which preferably are arranged in the outlet duct of the turbo-engine. Thus it becomes possible to bring the two nozzle flap pairs simultaneously into a sealing contact with the partition, and thus close both outlet ducts. In this case, the turbo-exhaust gases can be blown out by way of the reversed thrust openings against the propulsion direction, and thus cause a braking of the airplane after the landing.

Other objects, advantages and novel features of the present invention will become apparent from the following detailed description of the invention when considered in conjunction with the accompanying drawings.

BRIEF DESCRIPTION OF THE INVENTION

FIG. 1 is a schematic longitudinal sectional view of an integrated turboramjet engine with an adjustable propelling nozzle, constructed according to a preferred embodiment of the invention;

FIG. 2 is a view of the propelling nozzle with the expansion ramp in the turbo-operation;

FIG. 3 is a view of the propelling nozzle in the simultaneous turbo-operation and ramjet operation;

FIG. 4 is a view of the propelling nozzle in the ramjet operation;

FIG. 5 is a view of the propelling nozzle in the reversed thrust operation;

DETAILED DESCRIPTION OF THE DRAWINGS

Figure 6:
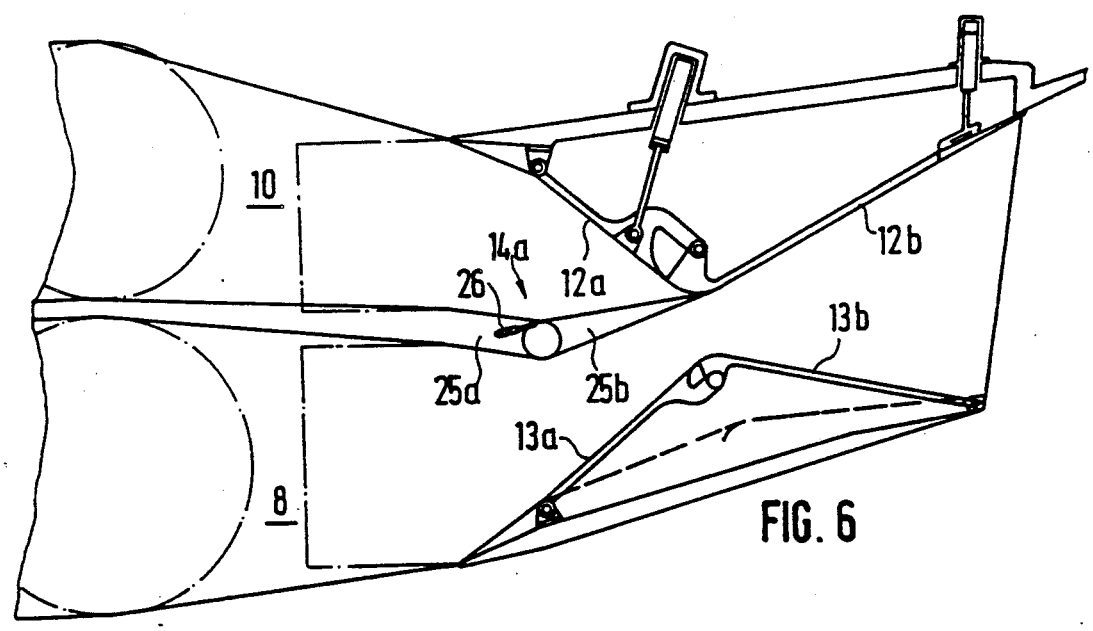
FIG. 6 is a view of another embodiment of the invention with a pivoted partition in the turbo-operation.

FIG. 1 is a longitudinal sectional view of an integrated turboramjet engine 1 which essentially comprises a gas turbo-engine 2 with a compressor, a combustion chamber and a turbine as well as a ramjet engine 3 which is arranged in parallel in this respect. Both partial engines 2, 3 can be alternatively closed by way of flaps 4a, b so that the air flowing in through the air inlet 5 can be supplied either to the gas turbo-engine 2, to the ramjet engine 3 or both. An afterburning chamber 6 with injection arrangements 7 is provided downstream of the gas turbo-engine 2, in which case the afterburning chamber 6 changes from a round cross-section in the area of the rear end of the gas turbo-engine 2 to the rectangular cross-section in the area of the rear edge of the turbo-outlet duct 8. The ram air engine 3 essentially comprises injection arrangements 9, downstream of which the ram air outlet duct 10 is formed ending in the area of its rear edge in a rectangular shape.

The actual propelling nozzle 11 comprises two pairs of nozzle flaps, the upper nozzle flap pair 12a, b comprising primary flap 12a and secondary flap 12b, and the lower nozzle flap pair 13a, b comprising primary flap 13a and secondary flap 13b.

The two outlet ducts 8, 10 are separated by a transversely arranged partition 14 which extends to the nozzle flap pairs 12a, b and 13a, b in such a manner that one or both nozzle flap pairs can sealingly rest against the partition 14. In the position shown in FIG. 1, the engine 1 is in the turbo-operating position; i.e., the flaps 4a are closed, and the ramjet engine 3 is therefore not supplied with air. At the same time, the flaps 4b of the gas turbo-engine 2 are open. In addition, the upper nozzle flap pair 12a, b has moved downward in such a manner that it rests sealingly against the partition 14 so that the ramjet outlet duct 10 is closed. At the same time, the lower nozzle flap pair 13a, b is in a position which is optimal for the actual flying Mach number. In this case, it is important that the upper nozzle flap pair 12a, b and the partition 14 have a sealing effect in such a manner that no high-pressure hot turbo-gas in the narrow cross-section 18 of the propelling nozzle 11 enters the ramjet engine 3 from the rear and, because of the excess pressure with respect to the air inlet, is taken in again by the gas turbojet engine 2.

FIG. 2 shows the propelling nozzle 11 in the same position, in which case it is also shown that the actual nozzle end surface 15 is defined by the end 16 of the expansion ramp 17, for example, the bottom wall of the airplane and the lengthening of the lower secondary flap 13b. The narrow cross-section 18 of the propelling nozzle 11 is caused by the adjusting of the upper or lower nozzle flap pairs 12a, b and 13a b, while the outlet cross-section and thus the divergence of the nozzle, the relationship of the nozzle end face 15 to the narrow cross-section 18, is determined essentially by the position of the lower secondary flap 13b.

The adjustment of the upper primary flap 12a takes place by a first adjusting arrangement 19a, and the upper secondary flap 12b is adjusted by means of the second adjusting arrangement 19b. The lower nozzle flap pair 13a, b is adjusted jointly by means of a third adjusting arrangement 19c.

The end edge 20 of the separating wall 14 is extended up in the direction of the top side 21a of the partition so that, in the shown position, a contour is obtained which is advantageous with respect to the flow from the bottom side 21b of the partition via the secondary flap 12b to the expansion ramp 17. At the same time, the bottom side 21b of the partition must be shaped such in the area of the end edge 20 that, in cooperation with the lower pair 13a, b of nozzle flaps defining the flow cross-section, a cross-sectional narrowing and thus a flow acceleration is always obtained in the direction of the narrowest cross-section 18.

The top side 21b of the partition is constructed to be adapted to the contour of the lower secondary flap 13b in order to result in a course which is extended downward everywhere. At the same time, in cooperation with the upper nozzle flap pair 12a, b, a convergent nozzle must be defined in front of the narrow cross-section 18. The contour in the narrow cross-section itself may be constructed as a sharp edge. In its cross-section, the area of the end edge 20 has an approximately beak-shaped contour.

In order to achieve an advantageous transition from the outlet ducts 8, 10 to the primary flaps 12a, 13a, guide plates 22a, b are mounted at the propelling nozzle 11, in which case the lower guide plate 22b can be retracted toward the front in order to expos deflecting plates 23 for the reversed-thrust operation.

For the take-off of the airplane without any afterburning, the propelling nozzle 11 is moved approximately into the position shown in FIG. 2, the upper secondary nozzle 12b being moved downward by means of the second adjusting arrangement 19b. This position (not shown) which at first causes a transition from the upper secondary flap 12b to the expansion ramp 17, which is disadvantageous with respect to the flow, is required because in this operating range a low divergence of the propelling nozzle 11 is required. This is achieved by means of the fact that the outlet cross-section 15 in this position is not determined by the expansion ramp 17 but by the imaginary lengthening of the upper secondary flap 12b. With an increasing flight Mach number, an increased divergence becomes necessary so that the upper secondary flap 12b is moved back into the position shown in FIG. 2. In the case of a high Mach number for the turbo-operation, thus in the range of approximately 2 Mach, the nozzle position shown in FIG. 2 will exist in the case of an afterburning.

When the flight Mach number is increased further, the ramjet engine 3 will be connected which takes place by, on the one hand, opening the flaps 4a (FIG. 1) and, at the same time, by means of the first adjusting arrangement 19a — as shown in FIG. 3 — moving up the upper nozzle flap pair 12a, b so that the ram air outlet duct 10 is exposed. When the speed increases further, the lower nozzle flap pair 13a, b, while narrowing the narrow turbo-cross-section, is moved up by means of the third adjusting arrangement 19c. In the case of pressure differences in the two nozzles, the expansion will freely adjust itself.

As shown in FIG. 4, when the flight Mach number is increased still further, the lower nozzle flap pair 13a, b is moved completely against the partition 14 whereby the turbo-outlet duct 8 is closed completely. However, first, the upper nozzle flap pair 12a, 12b will have moved up further, in which case the narrow cross-section 18 is first enlarged with respect to the position shown in FIG. 4. It is only when approximately the maximum speed is reached that a very high divergence of the propelling nozzle 11 becomes necessary so that the upper nozzle flap pair 12a, 12b is moved into the position for the maximum speed shown in FIG. 4 by means of the first adjusting arrangement 19a.

FIG. 5 shows the position of the propelling nozzle 11 after the landing of the airplane in the reversed thrust operation in which the upper 12a, 12b as well as the lower nozzle flap pair 13a, 13b have sealingly moved against the partition 14, thereby closing the ram air outlet duct 10. By means of the pushing-away of the lower guide plate 22b and of a cover plate 24, the turbo-outlet duct 8 is connected with an environment. By means of the deflecting plates 23, the exhaust gas of the gas turbo-engine 2, in this operating position, is deflected against the propelling direction and thus generates a deflecting reverse thrust for the braking of the airplane.

In this shown construction, the lower secondary flap 13b is provided with an adjusting arrangement 19d, whereby it can be adjusted separately from the lower primary flap 13a. It is possible, in this case, to do without the adjusting arrangement 19b of the upper secondary flap 12b.

Figure 7:
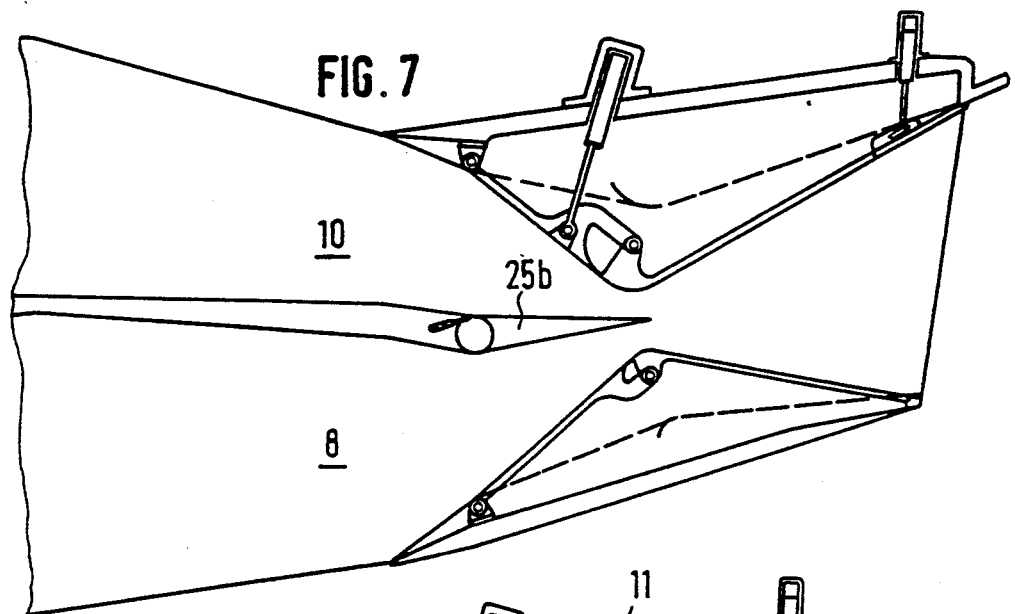
FIG. 7 is a view of this propelling nozzle of FIG. 6 in the simultaneous turbo-operation and ramjet operation.
Figure 8:
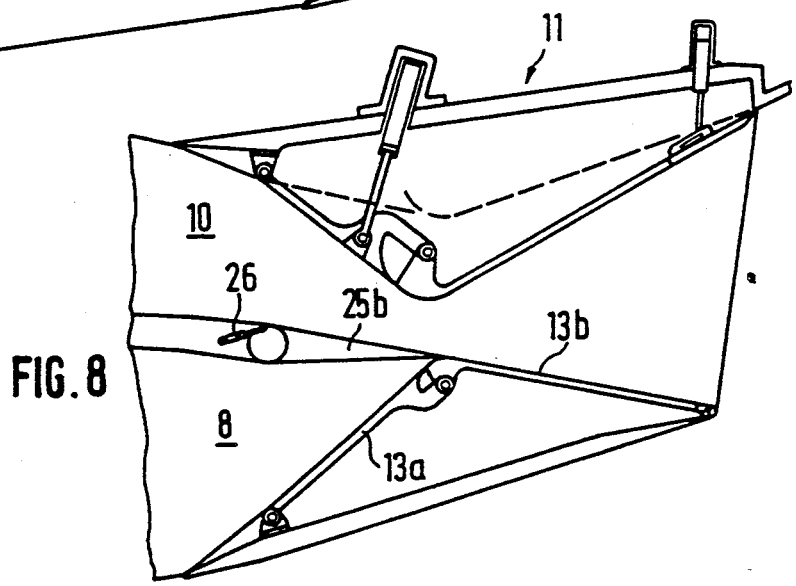
FIG. 8 is a view of this propelling nozzle of FIG. 6 in the ramjet operation.

Another embodiment of the invention is shown in FIGS. 6 to 8 in the different operating positions. This embodiment is characterized in that the partition 14a comprises a first fixed section 25a and a pivoted partition section 25b which can be pivoted around a transverse axis located in the fixed partition section 25a. The adjustment of the pivoted partition section 25b takes place by means of the swivelling arrangement 26. In the position shown in FIG. 6, the engine is in the turbo-operation, in which case the closing of the ram air outlet duct 10 does not take place merely by the moving-down of the upper nozzle flap pair 12a, 12b, but at the same time, the movable partition section 25b is swivelled upward. This advantageously reduces the swivel range required because of the nozzle flap pair for the closing of the ram air outlet duct 10.

FIG. 6 also shows the change of the cross-sections of the turbo-outlet duct 8 and the ram air outlet duct 10 in the flow direction from a round to a cornered cross-section. An interrupted line also shows the maximally required moving range of the two nozzle flap pairs 12a, b and 13a, b.

FIG. 7 shows the arrangement according to FIG. 6 during the simultaneous turbo-operation and ramjet operation, in which case the movable partition section 25b is located approximately in a center position, and both outlet ducts 8 and 10 are opened up. Finally, according to FIG. 8, this embodiment of the engine is in the ramjet operation; i.e., the turbo-outlet duct 8 is closed while the gas turbo-engine 2, which is not shown, is shut down, while the propelling nozzle is assigned exclusively to the ram air outlet duct 10. In this position, the partition section 25b, for this purpose, is moved into its lower end position by means of the swivelling arrangement 26, and the lower nozzle flap pair 13a, b is moved up so far that it sealingly rests against partition section 25b.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A single common propelling nozzle arrangement for a combined turboramjet engine of the type having a gas turbojet engine and a ramjet engine disposed with outlet ducts arranged adjacent one another, comprising:
    a partition extending between the outlet ducts, the downstream end of the partition being located at a narrowest cross-section of the common propelling nozzle,
    first movable nozzle flap means, having a first sealing edge, located at the ramjet engine outlet side of the partition second movable nozzle flap means, having a second sealing edge, located at the turbojet engine outlet side of the partition,
    and means for moving the first and second movable nozzle flap means between respective positions sealingly engaging the first and second sealing edges with the downstream end of the partition and respective positions spaced apart from the partition to thereby form respective outlet nozzles from said single common propelling nozzle arrangement for different operating conditions of the combined turboramjet engine.

2. A propelling nozzle arrangement according to claim 1, wherein the outlet ducts exhibit rectangular cross-sections.

3. A propelling nozzle according to claim 2, wherein the first movable nozzle flap means includes a first primary flap having a forward end pivotally connected to engine structure, and a first secondary flap pivotally connected to the first primary flap and disposed rearward thereof,
    and wherein the second movable nozzle flap means includes a second primary flap having a forward end pivotally connected to engine structure, and a second secondary flap pivotally connected to the second primary flap and disposed rearward thereof.

4. A propelling nozzle according to claim 3, wherein said means for moving includes means for changing the respective pivotal inclinations of the primary and secondary flaps with one another.

5. A single common propelling nozzle having a nozzle flow in a downstream direction for a combined turboramjet engine, comprising:
 a rectangular nozzle housing having parallel wall surfaces;
 upper primary and secondary flaps;
 lower primary and secondary flaps, both said upper and lower primary and secondary flaps forming a nozzle contour of said common nozzle having a variable course for both gas turbojet and ramjet engine operation and a variable narrowest cross-section;
 said primary flaps being pivotally connected upstream from said nozzle housing and having secondary flap pivots located on the side of said primary flaps facing away from the nozzle flow, said variable narrowest cross-section being located between pivot facing sides of said upper and lower secondary flaps;
 said secondary flaps being pivotally connected to said secondary flap pivots;
 wherein the gas turbojet and ramjet engines are axially arranged above one another and each have an outlet duct ending in said common nozzle at said variable narrowest cross-section, further comprising:
 a partition having top and bottom sides and a downstream end section, provided between both outlet ducts extending in the downstream direction to a narrowest cross-section of the single propelling nozzle;
 means for placing said primary and secondary flaps in positions providing an aerodynamically advantageous nozzle flow on both sides of said partition in a transition area of the primary to secondary flaps.

6. A propelling nozzle according to claim 5, wherein the end section of the partition is extended upwardly in the direction of the top side of the partition.

7. A propelling nozzle according to claim 5, wherein the partition is movable.

8. A propelling nozzle according to claim 7, wherein the partition can be displaced in the axial direction.

9. A propelling nozzle according to claim 7, wherein the partition can be swivelled around a transverse axis disposed in the wall plane.

10. A propelling nozzle according to claim 9, wherein the partition comprises a rigid part and a pivoted partition section.

11. A propelling nozzle according to claim 9, wherein devices for locking the partition in discrete positions are provided on both sides in nozzle side walls.

12. A propelling nozzle according to claim 9, wherein two or three discrete positions are provided for the movable partition.

13. A propelling nozzle according to claim 5, further comprising closable reverse thrust openings located in the gas turbojet outlet duct.

* * * * *